United States Patent [19]

Carre et al.

[11] Patent Number: 5,044,255
[45] Date of Patent: Sep. 3, 1991

[54] BRAKE REGULATOR WITH SECOND BOOST CHAMBER

[75] Inventors: Jean-Jacques Carre, Le Raincy; Philippe Castel, Paris; Pascal Le Normand, Aulnay Sous Bois, all of France

[73] Assignee: Bendix Europe Services Techniques, Drancy, France

[21] Appl. No.: 512,714

[22] Filed: Apr. 23, 1990

[30] Foreign Application Priority Data

Apr. 28, 1989 [FR] France ................................ 89 05661

[51] Int. Cl.5 ............................................. F15B 11/06
[52] U.S. Cl. .................................... 91/519; 91/376 R; 91/32; 91/19; 92/107; 92/152; 92/110
[58] Field of Search .................... 92/107, 151, 152, 37, 92/44, 6, 19, 32, 98 D, 117 A; 91/368, 369.1, 376 R, 508, 511, 512, 533, 519

[56] References Cited

U.S. PATENT DOCUMENTS

| 2,916,205 | 12/1959 | Litz ........................................ 92/152 |
| 3,412,649 | 11/1968 | Franz ..................................... 92/151 |
| 3,485,141 | 12/1969 | Ott et al. ............................... 92/151 |
| 3,999,266 | 12/1976 | Parker ............................... 92/98 D X |
| 4,226,167 | 10/1980 | Lew ................................... 92/152 X |
| 4,610,483 | 9/1986 | Matsumoto et al. ............. 91/519 X |
| 4,759,260 | 7/1988 | Lew ................................... 92/152 X |

FOREIGN PATENT DOCUMENTS 3343160  6/1984  Fed. Rep. of Germany .
2434959  2/1980  France .

Primary Examiner—Edward K. Look
Assistant Examiner—John Ryznic
Attorney, Agent, or Firm—Larry J. Palguta; Ken C. Decker

[57] ABSTRACT

The vacuum servomotor comprises a main casing (12) divided sealingly on the inside into first and second chambers (10, 20) by a flexible membrane (9) bearing on a rigid disk (7) integral with an activating piston (3). The first chamber (10) is subjected to a low pressure, while the second chamber (20) is subjected either to this low pressure or to a higher pressure. An auxiliary casing (25) is integral with the rigid disk (7) and projects into the first chamber (10), an auxiliary piston (27) sealingly dividing the auxiliary casing (25) on the inside into third and fourth chambers (30, 40), the third chamber (30) being closed by the rigid disk (7), the auxiliary piston (27) being mounted stationary relative to the main casing (12).

14 Claims, 4 Drawing Sheets

BRAKE REGULATOR WITH SECOND BOOST CHAMBER

BACKGROUND OF THE INVENTION

The present invention relates to vacuum servomotors designed in order to apply an additional force to an output member when a force is applied to an input member bearing on the output member and/or in order to apply a force to an output member following a signal emitted by a device outside the servomotor. Such servomotors are used on motor vehicles, particularly in order to boost braking.

Such a vacuum servomotor conventionally comprises a main casing divided sealingly on the inside into first and second chambers by a flexible membrane bearing on a rigid disk integral with an activating piton. The first chamber is subjected to a low pressure whilst the second chamber is subjected either to this low pressure when the servomotor is at rest, or to a higher pressure when the servomotor is in operation.

These servomotors have a large size which increases with the boost required. In point of fact, the engine compartment of present-day motor vehicles is extremely full and it is sometimes impossible to dispose, in this compartment, a servomotor whose outer diameter corresponds to the power boost required by the manufacturer.

Some manufacturers therefore use a servomotor of small size, the boost required then being obtained either by connecting the first chamber to a vacuum source which is greater than the usual source, or by subjecting the second chamber to a pressure which is greater than atmospheric pressure. In all cases, an auxiliary pump is required and this substantially increases the overall cost price of the boost device.

SUMMARY OF THE INVENTION

The object of the present invention is to remedy this disadvantage by increasing the effective area of the activating disk of a servomotor without increasing the outer diametral size.

Moreover, it is sometimes desirable, particularly in order to prevent skidding of the drive wheels, for the latter to be braked independently of an action exerted on the pedal by the driver. The present invention also makes it possible to construct a servomotor having this function.

To this end, according to the invention, at least one auxiliary casing is integral with the rigid disk and projects into the first chamber, an auxiliary piston sealingly dividing the auxiliary casing on the inside into third and fourth chambers, the third chamber being closed by the rigid disk and the auxiliary piston being mounted stationary relative to the main casing.

The auxiliary casing and the auxiliary piston are preferably annular.

According to a first embodiment, the auxiliary piston is mounted stationary relative to the main casing by means of at least one rigid rod passing successively through the third chamber, the rigid disk and, if appropriate, the membrane, the rod having an end bearing on the main casing in the second chamber. When this rod is hollow, it can also place the second and fourth chambers in communi-cation with one another.

According to another embodiment, the auxiliary piston is mounted stationary relative to the main casing by means of at least one rigid rod passing successively through a wall of the auxiliary casing and the first chamber, an end of the rigid rod being fixed firmly to the main casing in the first chamber while the other end of the rod is fixed firmly to the auxiliary piston.

BRIEF DESCRIPTION OF THE DRAWINGS

The invention will be better understood and other objects, advantages and features thereof will become more clearly apparent on reading the following description of embodiments which are given without implying any limitation and to which four plates of drawings are appended, in which.

In the figures, the reference numbers which denote the same object are identical.

DETAILED DESCRIPTION OF THE INVENTION

Figure 1:
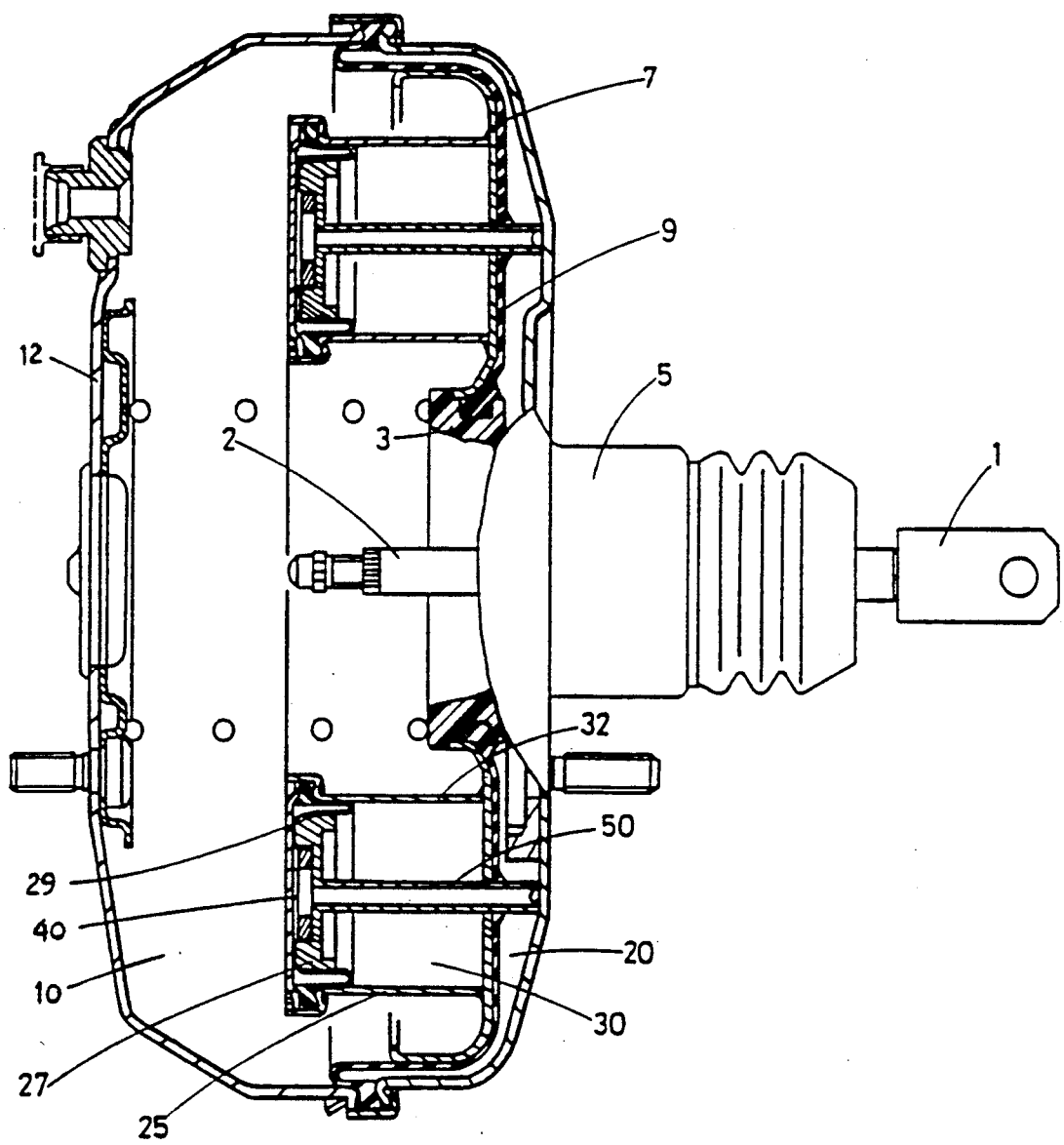
FIGS. 1 to 4 show diagrammatically in section various embodiments of a servomotor with an increased effective area according to the invention.

With reference, now, to FIG. 1, the servomotor comprises an input member 1 for example connected to the brake pedal (not shown) of the motor vehicle thus equipped, and an output member 2 bearing on the piston of a master cylinder (not shown) in the abovementioned example.

The output member 2 bears on the input member 1 and on an activating piston 3.

This activating piston is integral with a rigid activating disk 7 on which an unwinding membrane 9 rests, sealingly dividing the casing 12 into two chamber 10 and 20.

The chamber 10, or first chamber, is conventionally subjected to a low pressure, the vacuum source generally being controlled by the combustion engine The chamber 20, or second chamber, is subjected when at rest to the same low pressure as the chamber 10. A displacement of the input member 1 causes the closing of a communication orifice between the chambers 10 and 20 and the opening of an orifice placing the air at atmospheric pressure in communication with the chamber 20; this wellknown valve housed in the end section 5 of the servomotor, has not been shown.

The force resulting from the application of the difference in pressures prevailing in the two chambers 10 and 20 on the rigid disk 7 causes the piston 3 to move and applies an additional force, whose amplitude is a function of the area of the activating disk 7 to the output member.

In order to increase this area, an auxiliary annular casing 25 is fixed in the first chamber 10 to the rigid disk 7. An annular or auxiliary piston 27 sealingly divides this auxiliary casing 25 on the inside into two further chambers 30 and 40 by virtue of an auxiliary unwinding membrane 29.

Orifices 32 place the first chamber 10 and the third chamber 30, which is separated from the second chamber 20 by the rigid disk 7, in communication. The second and fourth chambers 20, 40 are in communication with one another.

Therefore, the effective area on which the difference in pressures is exerted is now determined by the section of the main casing 12 to which is added the section of the auxiliary casing. This results in a servomotor having a virtual diameter which is markedly greater than its actual diameter.

The annular piston 27 is mounted stationary relative to the wall of the second chamber 20 of the casing 12. At least one hollow rod 50 bears, on the one hand, against this wall and, on the other hand, is integral with the annular piston 27, enabling the second and fourth chambers 20, 40 to be placed in communication by virtue of an orifice made in this annular piston 27. The hollow rod 50 thus passes successively and sealingly through the third chamber 30, the rigid disk 7 and the main membrane 9.

In practice, it is desirable to use three or four hollow rods of this type.

Figure 2:
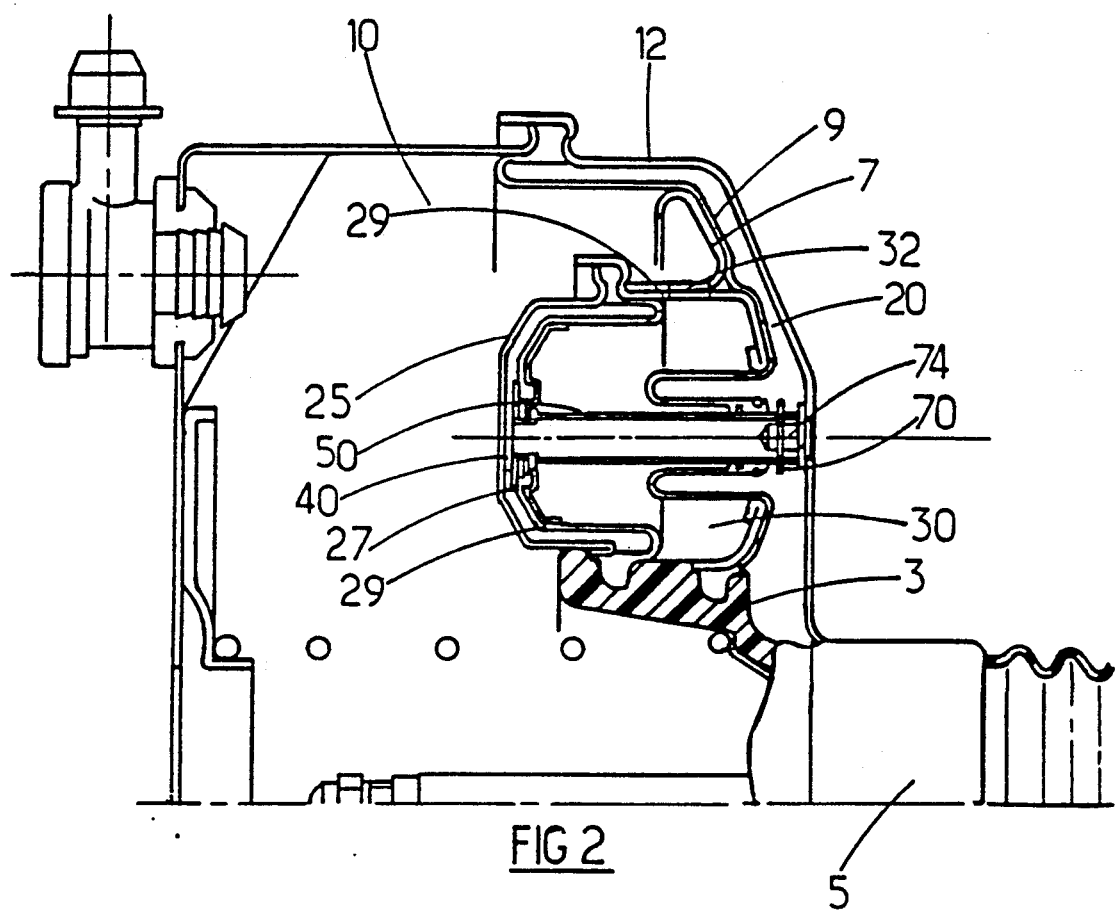

A particularly advantageous embodiment is diagrammatically and partially illustrated in FIG. 2. In this figure, in partial section, a mounting key 74, having an end in the shape of a conical point projecting into the second chamber 20, is fixed to the casing 12 opposite the hollow rod 50. The assembly of the whole is thus rendered extremely simple. In fact, when there is a pressure in the chamber 40, the piston 27 is pushed together with the hollow rod 50. The latter is then impaled non-sealingly on the key 74, a snapping means 70 being provided in order to prevent any subsequent movement of the auxiliary piston 27 relative to the casing 12.

Moreover, in the embodiment shown in this FIG. 2, the disk 7 has a conventional frustoconical shape and one wall of the auxiliary casing 25 is formed directly by part of the piston 3.

Figure 3:
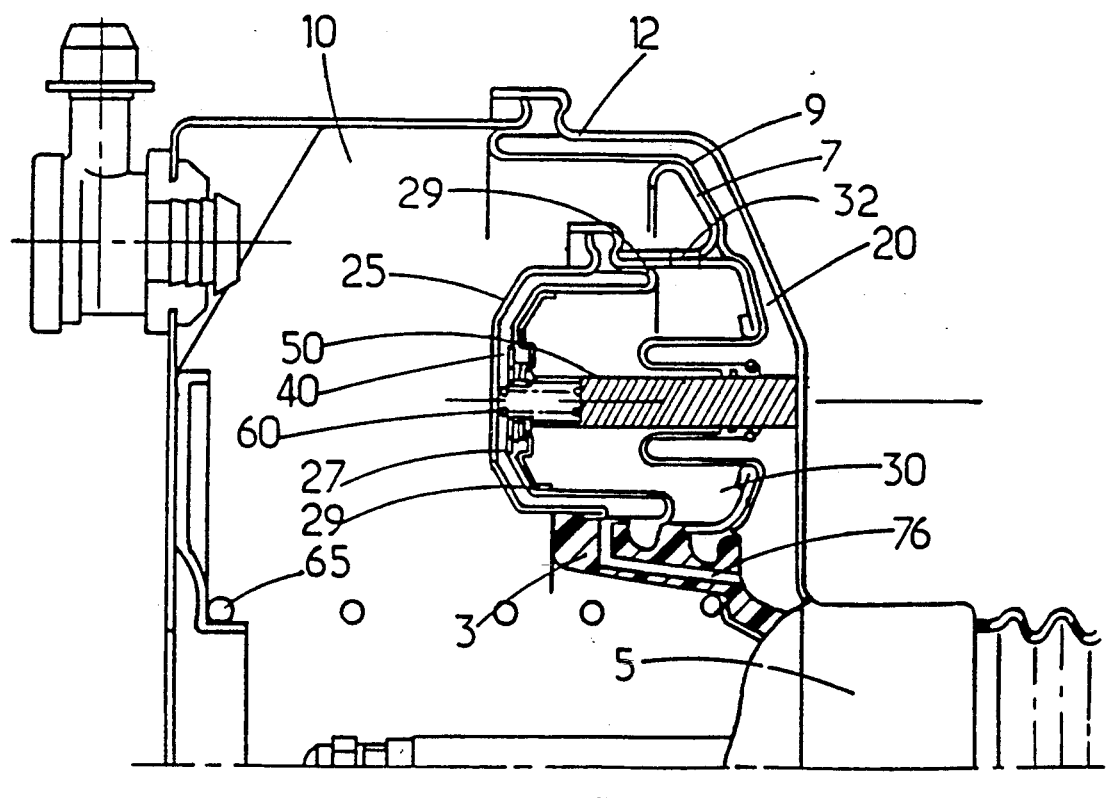

The embodiment illustrated in FIG. 3 is very similar to the embodiment in FIG. 2. However, it differs therefrom in that the rod 50 which is integral with the piston is not hollow and does not ensure communication between the chambers 20 and 40. In this case, this communication is obtained by means of a channel 76 provided in the piston 3.

On the other hand, the stationary retention of the auxiliary piston 27 relative to the wall of the second chamber 20 of the casing 12 is ensured by the force resulting either from the difference in the pressures applied between the chambers 30 and 40, when the servomotor is in action, or from the compression force of a spring 60 when the servomotor is at rest or in action at the start of travel. The compression of the spring 60 results from the fact that when the servomotor is at rest, the spring 65 has sufficient residual compression force in order to push the rigid disk 7 back to a stop and to compress the spring or springs 60. A difference of a few millimeters between the free length and compressed length of the spring 60 is sufficient to ensure the required function.

Figure 4:
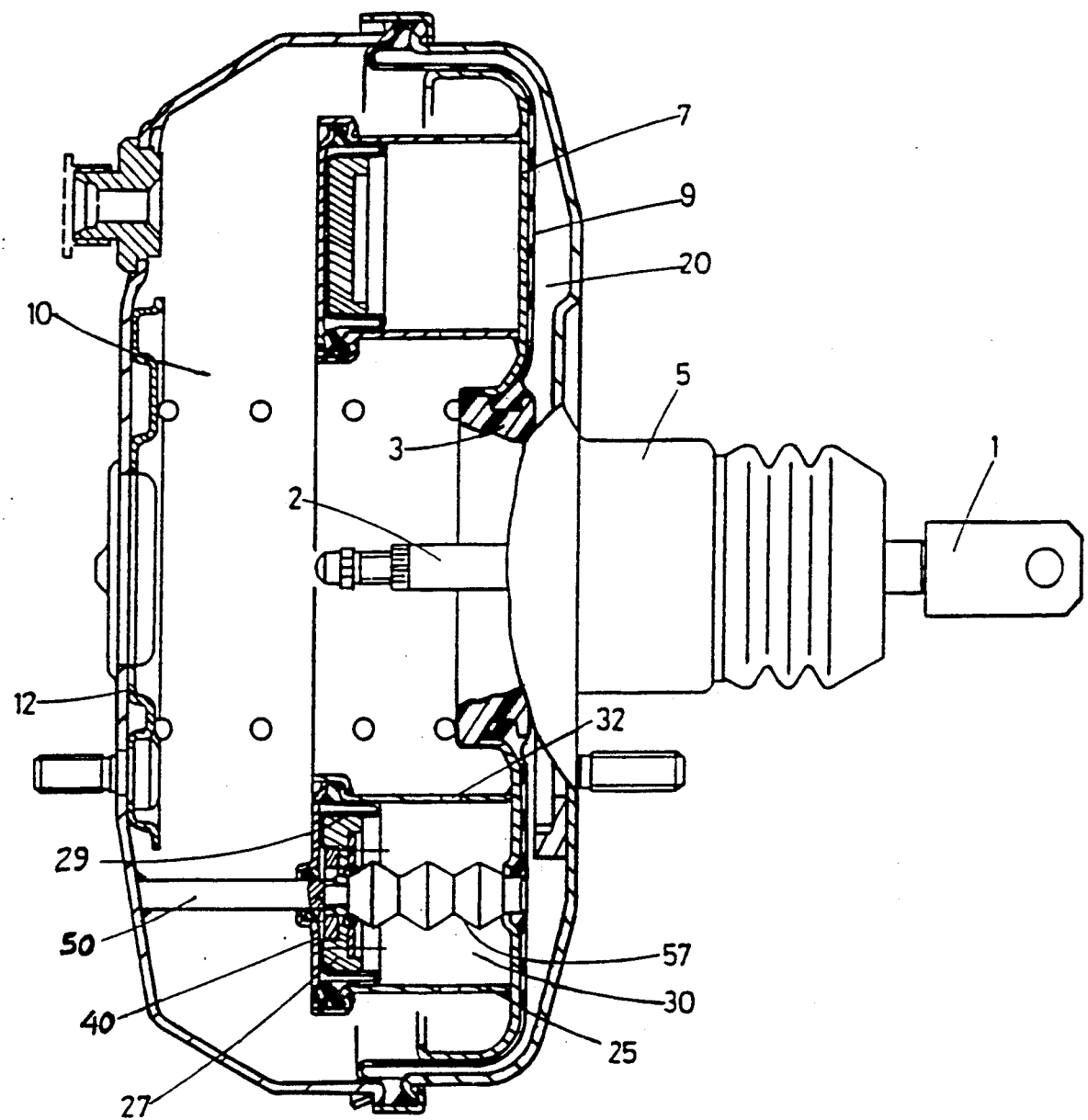

In the embodiment shown in FIG. 4, the annular piston 27 is integral with the end of at least one rod 50 whose other end is integral with the wall of the first chamber 10 of the main casing 12. Communication between the second and fourth chambers 20, 40 is obtained by means of a resilient bellows 57 disposed in the third chamber 30, one end of which is fixed to the flexible membrane 9 and the other end of which is fixed to an orifice made in the annular piston 27.

In the present case, the rigid rod passes sealingly through a wall of the annular casing 25, a gasket being provided to this end.

In this case, also, it is preferable to use three or four rigid rods of this type in order to distribute the forces.

Although only two preferred embodiments have been described, it is obvious that a person skilled in the art can make modifications without departing from the scope of the present invention as defined by the appended claims.

Obviously, the word "annular" for denoting the form of the auxiliary casing and of the corresponding piston refers to the conventional, substantially cylindrical shape of the shell of the main casing. However, "annular" must be understood to mean any possible shape whether this is an actual annular shape or, for example, an oval shape, which permits the output member to project into the center of the servomotor. Moreover, the auxiliary casing may also consist of a plurality of casings of small size. Finally, the rigid disk may have a frustoconical shape.

The above description of the embodiments relates to those in which it is desired to increase the effective area of the servomotor. To this end, provision was made for the third and fourth chambers to communicate, respectively, with the first and second chambers.

Figure 5:
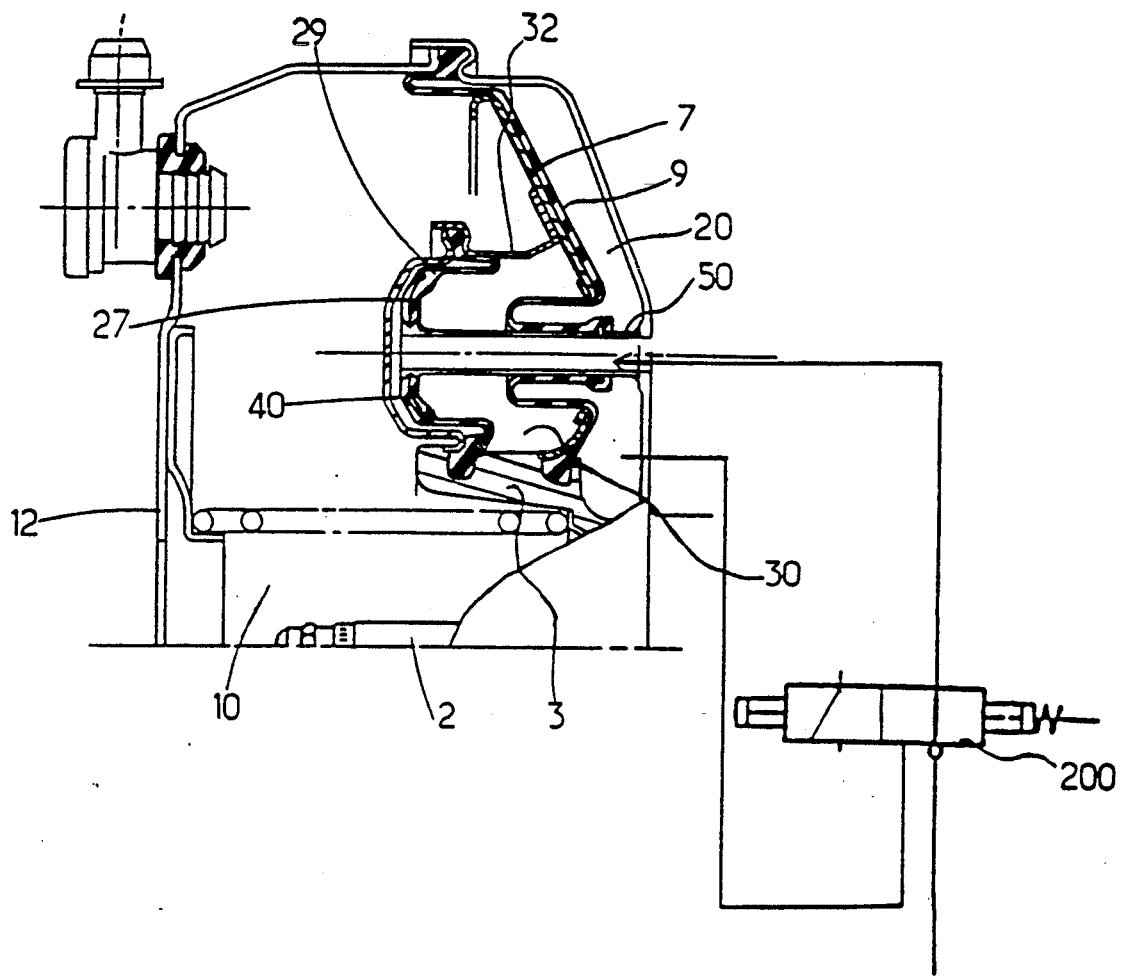
FIG. 5 shows diagrammatically the implementation of a servomotor according to the invention in a device for preventing the skidding of the drive wheels of the vehicle.

When it is desired to use such a servomotor in an antiskid device, the first and third chambers must, of course, always, be in communication. However, as shown in FIG. 5, the direct communication between the second and fourth chambers may advantageously be dispensed with, the fourth chamber then being connected, by means of a channel and of an electrovalve 200, to the second chamber or to a source of air at atmospheric pressure. The difference in pressures which can arise between the third and fourth chambers is thus sufficient in order to move the output member 2 independently of the action on the brake pedal, the detection of an imminent skidding of the drive wheels by a suitable computer causing the emission, by this computer, of a signal activating the electrovalve 200 which then establishes direct communication between the chamber 40 and the atmospheric air.

In the absence of activation of the electrovalve 200, the servomotor acts as a servomotor as described above.

The types of applications described above obviously do not limit the implementations of the invention.

For example, the auxiliary chamber 40 may be placed in communication with a suitable source of pressurized air which is present on the vehicle by means of an electrovalve or alternatively by means of a valve such as described in U.S. Pat. No. 4,117,769.

What we claim is:

1. A vacuum servomotor comprising a main casing divided sealingly on the inside into first and second chambers by a flexible membrane bearing on a rigid disk integral with an activating piston, said first chamber being subjected to a low pressure, while said second chamber is subjected to one of said low pressure and a higher pressure, said servomotor further comprising at least one auxiliary casing integral with said rigid disk and projecting into said first chamber, an auxiliary piston sealingly dividing said auxiliary casing on the inside into third and fourth chambers, said third chamber being closed by said rigid disk, said auxiliary piston being mounted stationary relative to said main casing.

2. The servomotor according to claim 1, wherein the auxiliary casing and the auxiliary piston are annular.

3. The servomotor according to claim 1 wherein a wall of said auxiliary casing is formed directly by part of the activating piston 4. The servomotor according to claim 1, wherein said auxiliary piston is mounted stationary relative to said main casing by means of at least one rigid rod passing successively through said third chamber, said rigid disk and, if appropriate, said membrane, said rod having an end bearing on said main casing in said second chamber.

5. The servomotor according to claim 4, wherein communication with said fourth chamber is ensured by means of said rod which is hollow and of an orifice made in said auxiliary piston.

6. The servomotor according to claim 5, wherein communication is ensured between said second and fourth chambers.

7. The servomotor according to claim 5, wherein an electrovalve provides both communication between said fourth chamber and a source of air at atmospheric pressure, and communication between the second and fourth chambers.

8. The servomotor according to claim 6, wherein said communication is ensured by a channel made in said activating piston.

9. The servomotor according to claim 4 wherein a mounting key is fixed to said casing so as to have an end projecting into said second chamber, said rod being impaled on said end.

10. The servomotor according to claim 9, wherein said mounting key is provided with snapping means which makes it possible to prevent any movement of said auxiliary piston relative to the casing.

11. The servomotor according to claim 1 wherein said auxiliary piston is mounted stationary relative to said main casing by means of at least one rigid rod passing successively through a wall of said auxiliary casing in said first chamber, an end of said rigid rod being fixed firmly to said main casing in said first chamber, while the other end of said rod is fixed firmly to said auxiliary piston.

12. The servomotor according to claim 11, wherein communication between said second and fourth chambers is ensured by a resilient bellows disposed in said third chamber, said bellows having one end fixed to said flexible membrane and the other end fixed to an orifice provided to and end in said auxiliary piston.

13. The servomotor according to claim 4, comprising at least three rods.

14. The servomotor according to claim 1, wherein communication between the first and third chambers is provided by at least one orifice made in the wall of said auxiliary casing.

* * * * *